(12) United States Patent
Clements et al.

(10) Patent No.: US 9,835,273 B2
(45) Date of Patent: Dec. 5, 2017

(54) FLEXIBLE PIPE BODY AND METHOD OF PROVIDING SAME

(71) Applicant: GE Oil & Gas UK Limited, Nailsea, Bristol (GB)

(72) Inventors: Richard Alasdair Clements, Durham (GB); Krishna Kant Agarwal, Rajasthan (IN); Ravindra Devi, Bangalore (IN); Jonathan David Leyland, Gateshead (GB); Senthamil Selvan, Tamil Nadu (IN)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 185 days.

(21) Appl. No.: 14/419,893

(22) PCT Filed: Jul. 12, 2013

(86) PCT No.: PCT/EP2013/064844
§ 371 (c)(1),
(2) Date: Feb. 5, 2015

(87) PCT Pub. No.: WO2014/023515
PCT Pub. Date: Feb. 13, 2014

(65) Prior Publication Data
US 2015/0219253 A1    Aug. 6, 2015

(30) Foreign Application Priority Data

Aug. 7, 2012 (EP) ..................................... 12179490
Jan. 21, 2013 (EP) ..................................... 13152092

(51) Int. Cl.
*F16L 11/15* (2006.01)
*F16L 11/08* (2006.01)
(Continued)

(52) U.S. Cl.
CPC .............. *F16L 11/15* (2013.01); *B31B 19/26* (2013.01); *E21B 17/015* (2013.01); *F16L 11/083* (2013.01)

(58) Field of Classification Search
USPC ........................................... 138/135, 131, 39
See application file for complete search history.

(56) References Cited

U.S. PATENT DOCUMENTS 1,913,390 A * 6/1933 Hungerford ............ F16L 11/16
                                                      138/135
3,605,817 A * 9/1971 Bauman .................... A47L 9/24
                                                      138/121

(Continued)

FOREIGN PATENT DOCUMENTS

DE        19945009 A1    1/2001

OTHER PUBLICATIONS

International Preliminary Report on Patentability and Written Opinion of the International Searching Authority, dated Feb. 19, 2015, for corresponding International Application No. PCT/EP2013/064844, 6 pages.

(Continued)

*Primary Examiner* — James Hook
(74) *Attorney, Agent, or Firm* — Klarquist Sparkman, LLP

(57) ABSTRACT

A flexible pipe body and method of producing a flexible pipe body, the flexible pipe body including a collapse resistant layer comprising a radially inner surface and a radially outer surface, the radially inner surface comprising a plurality of substantially regular protrusions and/or depressions extending in a direction perpendicular to a tangent of the radially inner surface, for breaking up a boundary layer of fluid flowing along the flexible pipe body in use.

13 Claims, 8 Drawing Sheets

(51) Int. Cl.
  *E21B 17/01* (2006.01)
  *B31B 19/26* (2006.01)

(56) References Cited

U.S. PATENT DOCUMENTS

| | | | | |
|---|---|---|---|---|
| 3,682,203 | A * | 8/1972 | Foti | F16L 11/16 138/135 |
| 4,621,953 | A * | 11/1986 | McGuth | F16L 57/06 138/39 |
| 4,865,271 | A * | 9/1989 | Savill | B63B 1/34 114/67 R |
| 5,263,793 | A * | 11/1993 | Sirovich | B64C 21/10 138/39 |
| 5,362,179 | A * | 11/1994 | Sirovich | B64C 21/10 123/538 |
| 5,669,420 | A * | 9/1997 | Herrero | B21C 37/121 138/122 |
| 5,833,389 | A * | 11/1998 | Sirovich | B64C 21/10 138/39 |
| 6,155,303 | A * | 12/2000 | Krawietz | F01N 13/1816 138/121 |
| 6,363,972 | B1 * | 4/2002 | Umazume | B63B 1/36 138/177 |
| 2002/0195157 | A1 * | 12/2002 | Foti | F16L 11/16 138/135 |
| 2003/0070719 | A1 | 4/2003 | Espinasse et al. | |
| 2004/0206410 | A1 * | 10/2004 | Extrand | B01L 3/502707 138/39 |
| 2004/0209047 | A1 * | 10/2004 | Extrand | B01L 3/502746 428/156 |
| 2009/0217981 | A1 * | 9/2009 | Extrand | B82Y 30/00 137/1 |
| 2009/0260702 | A1 * | 10/2009 | Kim | B29C 33/52 138/39 |
| 2012/0180991 | A1 * | 7/2012 | Viswanathan | F28F 1/40 165/104.14 |
| 2013/0081772 | A1 * | 4/2013 | Eagles | D21F 7/08 162/358.2 |

OTHER PUBLICATIONS

International Search Report and Written Opinion of the International Searching Authority, dated Aug. 21, 2013, for corresponding International Application No. PCT/EP2013/064844, 9 pages.

"Communication—European Search Report" from the European Patent Office for European Application No. EP13735349.6-1605, dated Mar. 10, 2016, 6 pages.

Gudme et al., "Qualification of Lean Duplex Grade LDX 2101 (UNS32101) for Carcass Material in Flexible Pipes," NACE International Corrosion 2009 Conference & Expo, Paper No. 09075, Mar. 26, 2009, 16 pages.

"Roughness measurements of stainless steel surfaces," retrieved from http://www.worldstainless.org/Files/issf/non-image-files/PDF/Euro_Inox/RoughnessMeasurement_EN.pdf,, Jan. 1, 2014, 7 pages.

\* cited by examiner

FLEXIBLE PIPE BODY AND METHOD OF PROVIDING SAME

CROSS REFERENCE TO RELATED APPLICATIONS

This is the U.S. National Stage of International Application No. PCT/EP2013/064844, filed Jul. 12, 2013, which in turn claims the benefit of European Patent Nos. EP12179490.3, filed Aug. 7, 2012 and EP13152092.6, filed Jan. 21, 2013.

The present invention relates to a flexible pipe body and a method of providing a flexible pipe body. In particular, but not exclusively, the present invention relates to a flexible pipe body having an inner collapse resistant layer with improved performance in terms of fluid flow through the pipe body compared to known designs.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a tubular, pressure-containing conduit. The pipe structure allows large deflections without causing bending stresses that impair the pipe's functionality over its lifetime. The pipe body is generally built up as a combined structure including metallic and polymer layers.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 may be formed from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. The layer thicknesses are shown for illustrative purposes only.

As illustrated in FIG. 1, a pipe body includes an innermost carcass layer 101 as a collapse resistant layer. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer may be formed from a helically wound elongate metallic tape element, where windings are interlocked with adjacent windings to form the interlocked construction. A cut away illustration of a known carcass layer 301 is shown in FIG. 3. FIG. 4 shows a longitudinal cross sectional view through a wall of the carcass layer 301. Such a carcass layer may be formed by folding an elongate strip of stainless steel, for example, with a rectangular cross section, to have an approximate reverse S-shaped cross section, and winding the strip helically such that a first hooked portion locates over and nests into a corresponding hooked portion of an adjacent winding. As shown in FIG. 4, the dimensions of the hooked regions may allow for a degree of movement between adjacent windings in the axial direction. The movement may be beneficial in allowing a predetermined amount of bending of the flexible pipe.

Referring back to FIG. 1, the internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications.

As mentioned above, rough bore and smooth bore flexible pipes are known. Smooth bore flexible pipe includes a fluid retaining layer called a liner. A smooth inner surface of the liner defines a bore along which fluid is transported. Smooth bore flexible pipes are used in various applications, such as for water injection, or for shallow water applications. However, on occasion when a bore is depressurised an accumulated pressure in an annulus region of the flexible pipe between the liner and a radially outer layer can cause the liner to collapse and this leads to irreversible damage. Therefore in some applications where collapse resistance is important, a carcass layer is used inside the fluid retaining layer. This is a so-called rough bore application and the carcass layer, which is often formed by helically winding shaped strips in an interlocked fashion as shown in cross section in FIG. 3, prevents collapse of the fluid retaining layer under depressurisation of the bore by supporting the fluid retaining layer.

Known carcass layers generally give a less smooth finish to the inner surface of the pipe body compared to a liner, because of the particular cross-sectional profile of the carcass layer. For example, as shown in the carcass cross section of FIG. 4, there exists a plurality of substantially flat portions $303_{1,2}$ and cavities $305_{1,2}$ forming the radially inner surface 307 of the carcass layer 301. The cavities are a void area of unfilled space and effectively extend radially outwardly in an approximate rhomboid-type shape 309 in cross section (shown in dotted lines in FIG. 4). Of course the cavities shown in the cross section will actually be a single cavity that helically extends continuously around the inner surface of the carcass layer 301, though other known carcass layers may have other configurations. Because of such cavities present in a carcass layer cross section, this can adversely affect fluid flow through the pipe.

A problem which is experienced with rough bore applications is that the interlocked shaped strip of a carcass layer has a detrimental effect upon the flow of fluid along the flexible pipe. More specifically in a pipe transporting gas the irregular inner surface of the carcass leads to the formation of vortices in the fluid flow which can give rise to pressure variations. These pressure variations can cause problems particularly when resonance occurs (the pressure variations can match the natural harmonic resonance frequencies of parts of the pipe or connected structures resulting in a multiplication of the effect). These pressure fluctuations and vibrations which are generated can cause damage and ultimately failure, through fatigue, of ancillary equipment connected to a flexible pipe. The term vortex induced vibration (VIV) has been coined in the art to describe the phenomenon which results in such problems.

More specifically, the pressure variations generated within a flexible pipe can be heard as sharp acoustic tones known as "singing". The pressure variations lead to pipe vibration and alternating stresses along the pipe. This problem has been found to occur at relatively higher fluid export velocities through the riser. As such, if singing occurs, the productions rates have to be limited.

The singing problem can be attributed to flow induced pulsations that are generated on the inner surface of the flexible pipe. When the vortex shedding frequency excites the acoustic natural frequency of the pipeline, resonance between structural vibrations, standing acoustical waves and vortex shedding appear. There are 3 aspects related to the singing problem—(i) vortex shedding in carcass cavities (ii) acoustic energy reflected from pipe ends and (iii) feed-back between acoustic field and fluid flow.

Those skilled in the art have been working to try and "smooth out" the inner surface of the carcass layer in various ways in an attempt to try and reduce fluid flow vortices and riser singing.

Alternatively, WO2012/131354 describes a vortex shedding member provided in the bore of a pipe.

According to a first aspect of the present invention there is provided a flexible pipe body for transporting fluids from a sub-sea location, comprising:

a collapse resistant layer comprising a radially inner surface and a radially outer surface, the radially inner surface comprising a plurality of substantially regular protrusions and/or depressions extending in a direction perpendicular to a tangent of the radially inner surface, for breaking up a boundary layer of fluid flowing along the flexible pipe body in use.

According to a second aspect of the present invention there is provided a method of providing a flexible pipe body, comprising:

providing a collapse resistant layer comprising a radially inner surface and a radially outer surface, the radially inner surface comprising a plurality of substantially regular protrusions and/or depressions extending in a direction perpendicular to a tangent of the radially inner surface, for breaking up a boundary layer of fluid flowing along the flexible pipe body in use.

According to a third aspect of the present invention there is provided a flexible pipe body substantially as herein described with reference to the drawings.

According to a fourth aspect of the present invention there is provided a method substantially as herein described with reference to the drawings.

Certain embodiments of the invention provide the advantage that a flexible pipe body is provided that has good collapse resistance, yet prevents or reduces vortex induced vibrations compared to known pipe body designs.

Certain embodiments of the invention provide a flexible pipe structure that gives superior free flow of fluids through its bore in use compared to known pipe structures.

The collapse resistant layer may be a carcass layer.

The flexible pipe body may further comprise a barrier layer, a hoop strength layer and an outer fluid-retaining layer provided radially outwards of the collapse resistant layer.

The disclosure also encompasses use of flexible pipe body for the transportation of production fluids from a sub-sea location.

The method of providing a flexible pipe body may comprise forming an elongate tape element and helically winding the tape element to form the collapse resistant layer.

The method of providing a flexible pipe body may comprise forming a plurality of discrete annular elements and interlocking the annular elements to form the collapse resistant layer.

The method of providing a flexible pipe body may further comprise providing a barrier layer, a hoop strength layer and an outer fluid-retaining layer provided radially outwards of the collapse resistant layer.

The method of providing a flexible pipe body may further comprise the step of folding the elongate sheet element prior to forming the sheet element into a substantially cylindrical configuration.

Embodiments of the invention are further described hereinafter with reference to the accompanying drawings, in which.

In the drawings like reference numerals refer to like parts.

The present inventors have performed a 2-D LES CFD simulation (2-Dimensional Large Eddy Simulation Computational Fluid Dynamics) to identify shear layer oscillations in the flow of fluid travelling along a flexible pipe. In particular, the inventors have studied the fluid flow along the longitudinal direction of the bore of a flexible pipe by viewing a 2-dimensional cross-section though a flexible pipe during fluid transport. As used herein, the term shear layer will be used to denote an interface between portions of flowing fluid where a large velocity gradient is present (for example from a flow velocity of 30 m/s down to zero within the carcass interstices). A skilled person will realise that fluid flowing along the bore of a pipe will have a portion of fluid adjacent the pipe wall that is subject to shear forces, thus causing a more turbulent flow (vorticity) with fluid flowing at different velocities. Another portion of fluid, generally in the central portion of the pipe, will be relatively unaffected by forces from the pipe wall. In particular, when an inner surface of a pipe is not smooth the vorticity may be great. The boundary between the area that is affected by shear forces and the area that is unaffected by shear forces is termed the boundary layer.

Figure 4:
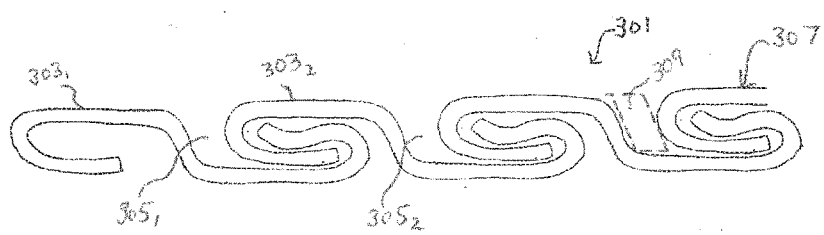
FIG. 4 illustrates a cross sectional view of the carcass layer of FIG. 3.
Figure 5:
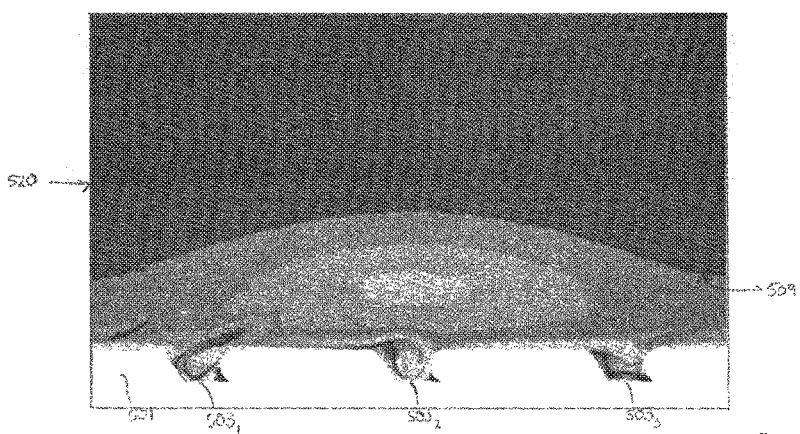
FIG. 5 illustrates fluid flow through a known flexible pipe body.
Figure 6:
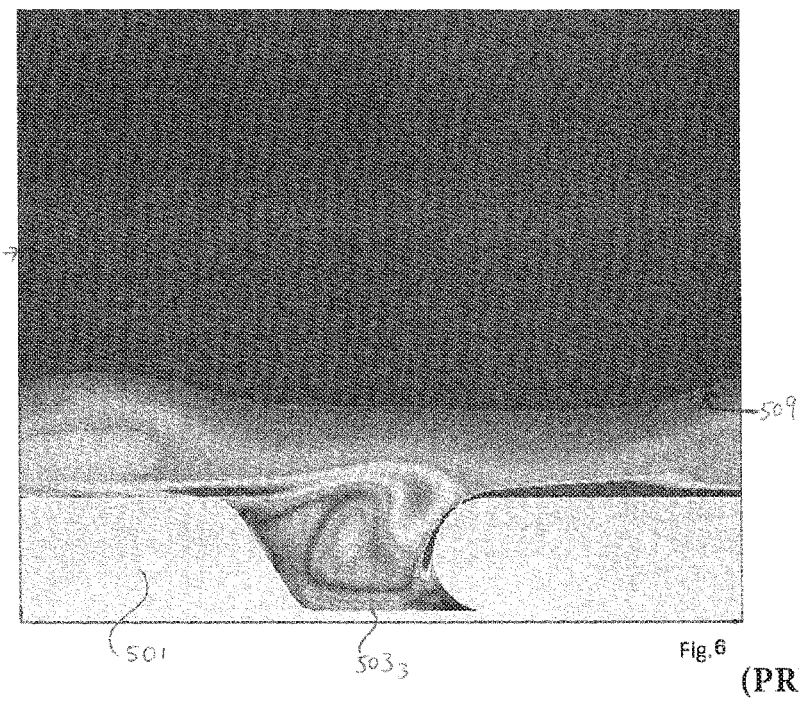
FIG. 6 illustrates an enlarged view of a portion of FIG. 5.

FIGS. 5 and 6 illustrate vorticity contours of fluid flowing from left to right as shown in the diagram along the bore 520 of a flexible pipe. Whilst of course a longitudinal cross section through a pipe will show two walls of the pipe enclosing a pipe bore, only one wall of the carcass layer 501 and a part of the bore is shown in the figure. In this case the flexible pipe body tested includes a known carcass layer 501 with a cross sectional profile the same as shown in FIG. 4.

The carcass layer 501 was formed from a helically wound elongate metallic tape element, where windings are interlocked with adjacent windings to form the interlocked tubular construction. The carcass layer 501 was formed by folding an elongate strip of stainless steel, for example, with a rectangular cross section, to have an approximate reverse S-shaped cross section, with a first end folded over to form a first hooked portion and a second end folded in the opposite direction to form a second hooked portion, and a diagonally formed central body portion. The strip was helically wound such that the first hooked portion locates over and nests into a corresponding valley of the second hooked portion of an adjacent winding. As per FIG. 4, the dimensions of the hooked regions allow for a degree of movement between adjacent windings in the axial direction.

Figure 1:
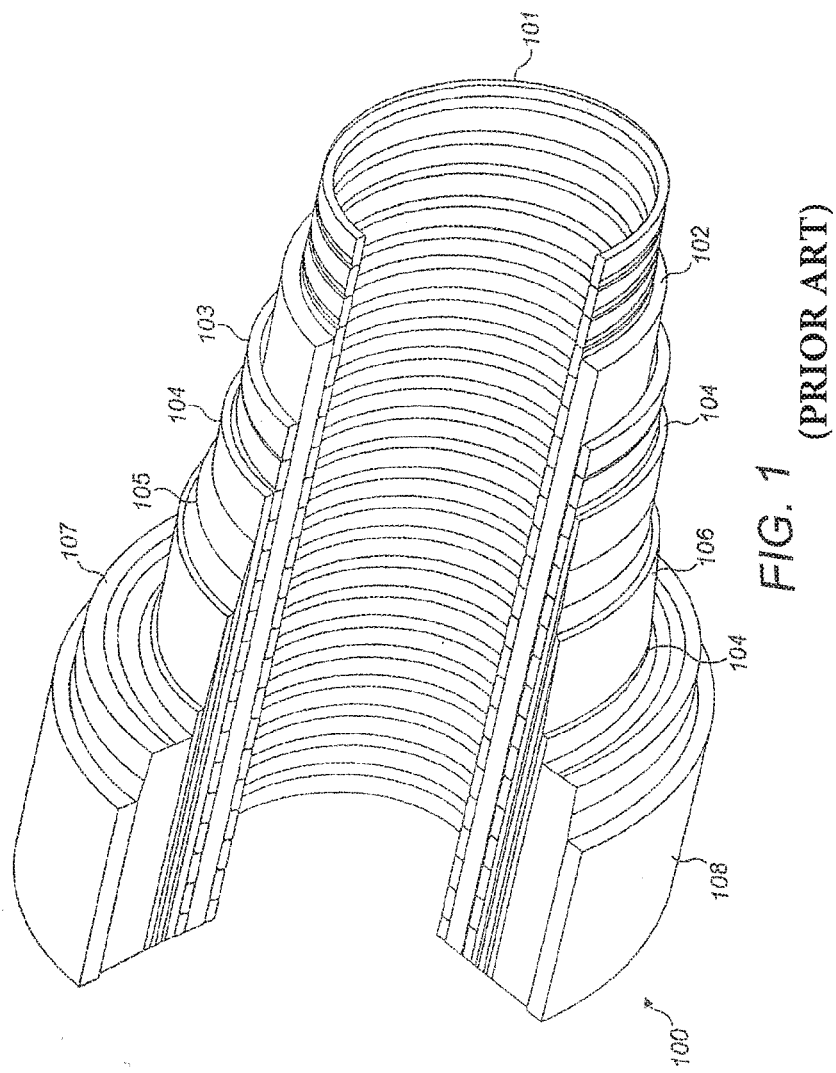
FIG. 1 illustrates a flexible pipe body.
Figure 2:
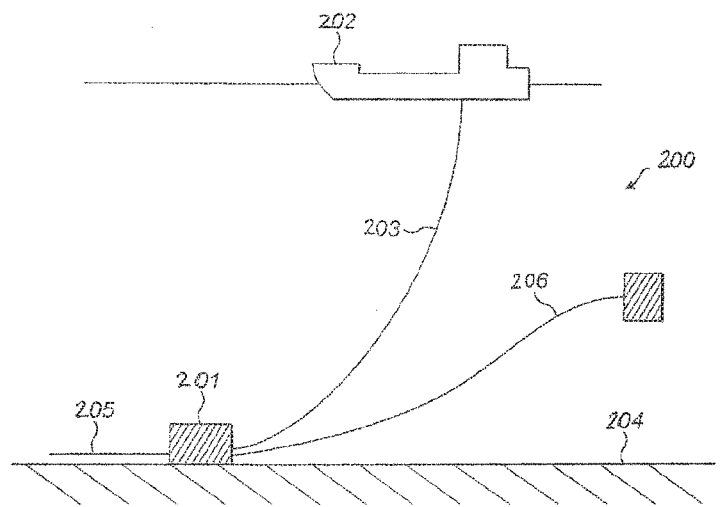
FIG. 2 illustrates a riser assembly.
Figure 3:
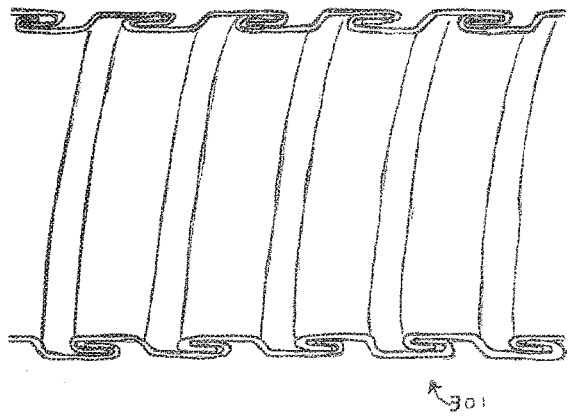
FIG. 3 illustrates a cut away view of a known carcass layer.
Figure 7:
FIG. 7 illustrates the interlocked carcass layer after the process of FIG. 6.

The tape element is formed into the 'S' shaped profile as shown in FIG. 7 by passing the tape element between six sets of forming rollers (not shown). The tape element is wound in a spiral around a mandrel to interlock each section of tape element together, giving a continuous length of carcass (as shown in FIG. 3). As such, the tape element is folded a number of times, in pre-determined places and ways, as it passes between the rollers, just prior to reaching the mandrel.

Referring back to FIGS. 5 and 6, the different areas of shading shown in the bore 520 illustrate fluid flowing along the bore at different velocities. It can be seen that the fluid flow is affected by the presence of the cavities $503_{1-3}$, which create vortices of fluid flow as fluid enters and leaves the cavities. The result is a turbulent fluid flow along the carcass inner surface to the boundary layer 509. It is this turbulent fluid flow that can lead to VIVs and riser singing, as discussed above.

Figure 8:
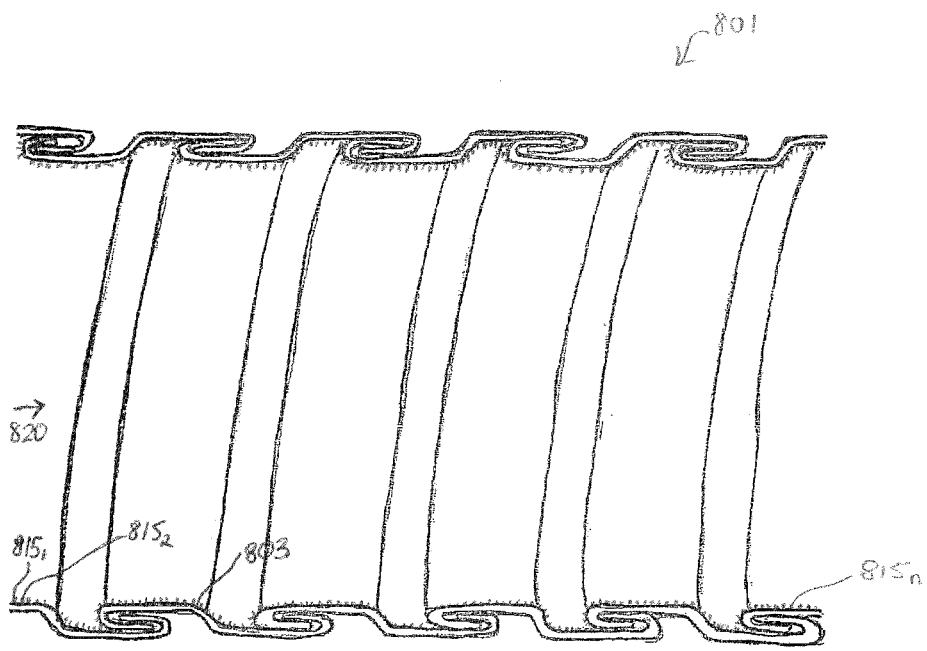
FIG. 8 illustrates cut away view of a carcass layer according to the present invention.
Figure 9:
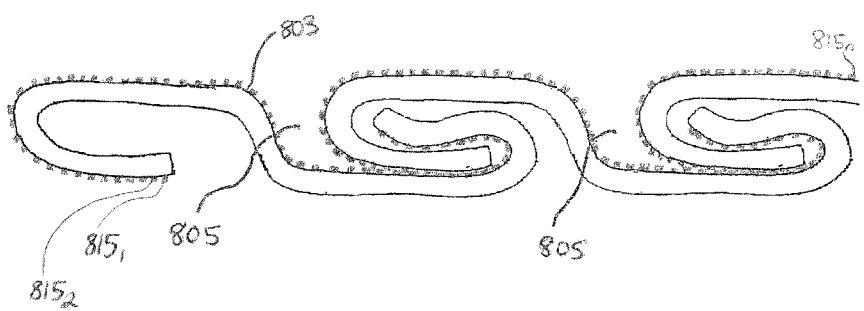
FIG. 9 illustrates a cross sectional view of the carcass layer of FIG. 8.
Figure 10:
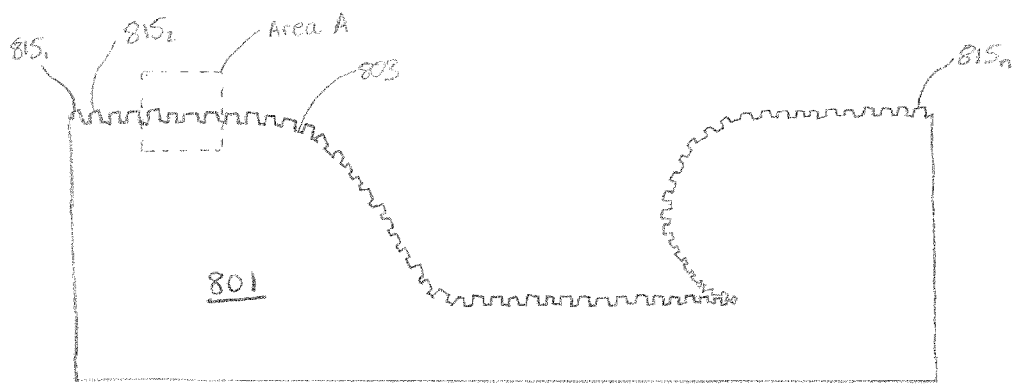
FIG. 10 illustrates an enlarged view of a portion of FIG. 9.
Figure 11:
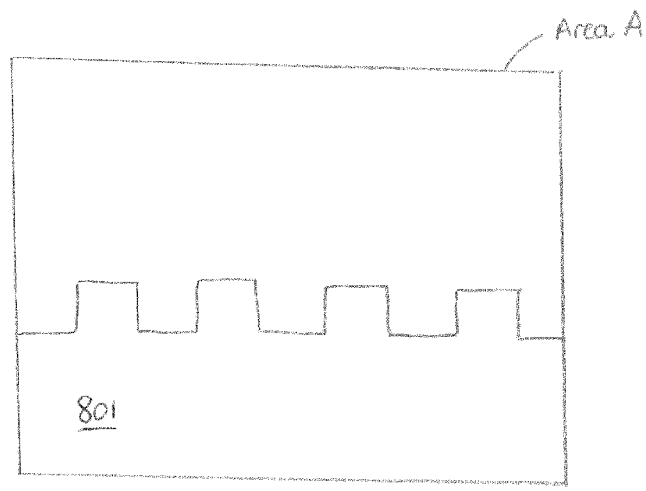
FIG. 11 illustrates an enlarged view of a portion of FIG. 10.

FIGS. 8 to 11 illustrate a portion of carcass layer 801 according to the present invention. More specifically, FIG. 8 shows a cut-away portion of a portion of a carcass layer 801 of a flexible pipe body, FIG. 9 shows a cross-sectional view through the wall of the carcass layer 801, FIG. 10 shows an enlarged view of a portion of the carcass layer shown in FIG. 9, and FIG. 11 shows a yet further enlarged view of a portion of the carcass layer shown in FIG. 10 (identified as Area A). It can be seen that the carcass layer is similar in some respects to the carcass layers 301, 501 described above and for brevity the same features will not be discussed. However, the carcass layer 801 includes protrusions $815_{1-n}$ formed on a surface 803 of the sheet forming the carcass layer 801. As such, the protrusions $815_{1-n}$ are provided on the surface facing the radially inner side of the layer. Since the sheet forming the carcass layer has a folded configuration, there are cavities 805 present along the radially inner (and radially outer) surface of the carcass layer. The cavities are a void area of unfilled space and effectively extend radially outwardly in an approximate rhomboid-type shape in cross section.

The protrusions $815_{1-n}$ are formed integrally with the carcass layer, i.e. an integral part of the carcass layer. As such the plurality of protrusions are unitary with the collapse resistant layer.

The protrusions $815_{1-n}$ are in a substantially regular arrangement (i.e. regularly spaced) extending from the surface 803 of the carcass layer. Of course, when not looking at the cross section but looking at the entire 3-dimensional form, the protrusions shown will actually extend over substantially the full radially inner surface of the substantially cylindrical carcass layer 801. As such the protrusions will extend in a direction perpendicular to a tangent of the cylindrical inner surface. A protrusion 815 may helically extend continuously around the inner surface of the carcass layer. Here, the protrusions extend along a longitudinal axis of the flexible pipe body as well as around a circumference of the flexible pipe body. However, it will be appreciated that the protrusions may extend only on a portion along a longitudinal axis of the pipe body, and/or only partly around a circumference of the pipe body. The portion of the pipe body (carcass layer) may be at an end of the pipe body, or in an intermediate position of the pipe body.

Conversely, although the above description describes a plurality of protrusions, it can be seen that the surface 803 could equally be described as having a plurality of depressions.

Aptly the protrusions 815 have a height of between about $\frac{1}{1000}^{th}$ and $\frac{1}{10}^{th}$ the depth of the cavities 805. More aptly, the protrusions have a height of between about $\frac{1}{750}^{th}$ and $\frac{1}{300}^{th}$, or $\frac{1}{300}^{th}$ and $\frac{1}{100}^{th}$, or $\frac{1}{700}^{th}$ and $\frac{1}{100}^{th}$, or $\frac{1}{70}^{th}$ and $\frac{1}{10}^{th}$, the depth of the cavities 805, depending upon the strip thickness and the form created in the manufacturing process. The height of a protrusion would be measured from the base at the surface 803 to its peak. The depth of the cavity 805 would be measured from the horizontal portions (according to FIGS. 8 to 10) forming the radially inner surface to the horizontal portion (according to FIGS. 8 to 10) forming the base of the cavity 805.

Aptly, the protrusion has a height of about 200 μm or less. More aptly, the protrusion has a height of about 150 μm or less. More aptly, the protrusion has a height of about 100 μm or less. More aptly, the protrusion has a height of about 50 μm or less.

Aptly the protrusions are of equal height, or vary in height by 10% of the total height.

Aptly the cavities are of equal depth, or vary in depth by 10% of the total depth.

Aptly the cavity has a depth of around 2.5 mm. In this case the protrusions may aptly have a height of 20 μm.

The protrusions are arranged to break up the boundary layer of fluid flowing along the flexible pipe body.

The protrusions 815 in this embodiment are formed during manufacture of the sheet used to form the carcass layer 801 (and before forming the sheet into a cylindrical configuration). That is, a generally flat sheet of material, e.g. metal, stainless steel, etc. is provided as an elongate tape element (i.e. approximately rectangular in shape), having protrusions 815 formed on one side of the sheet. The protrusions are formed as an integral portion of the tape element. The protrusions may be formed on the surface of the sheet (i) during manufacture of the sheet itself, for example by using one suitably shaped roller and one flat roller to roll the sheet, or (ii) taking a finished flat-rolled (smooth) sheet and then post working the sheet so as to form depressions into one surface of the sheet, for example.

Then, in a cold forming process, the sheet is sequentially folded in a multi-stage operation using rollers, to eventually provide an open, approximate reverse S-shaped cross-section, which is then helically wound and pressed shut (into interlock with the adjacent helical wrap, as can be seen in FIG. 7) by additional rollers on a sizing mandrel. That is, the sheet is folded continuously along its length as it passes through the rollers (i.e. not necessarily all folded at the same time). Each winding of the tape element is interlocked with its adjacent windings via the interlocking process so as to give a substantially cylindrical tubular layer (as shown in FIG. 8). The strip is wound helically such that a first hooked portion locates over and nests into a corresponding hooked portion of an adjacent winding. As shown in FIG. 9, the dimensions of the hooked regions may allow for a degree of movement between adjacent windings in the axial direction. The movement may be beneficial in allowing a predetermined amount of bending of the flexible pipe. As shown in FIG. 9, the carcass layer 801 has a number of cavities 805 on the bore facing side of the layer.

Figure 12:
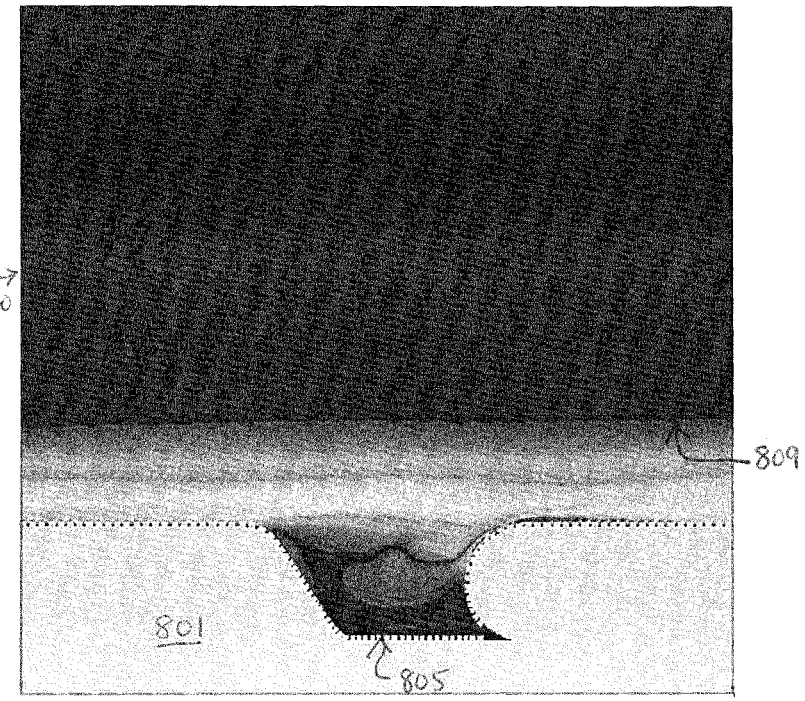
FIG. 12 illustrates fluid flow through a flexible pipe body of the present invention.
Figure 13:
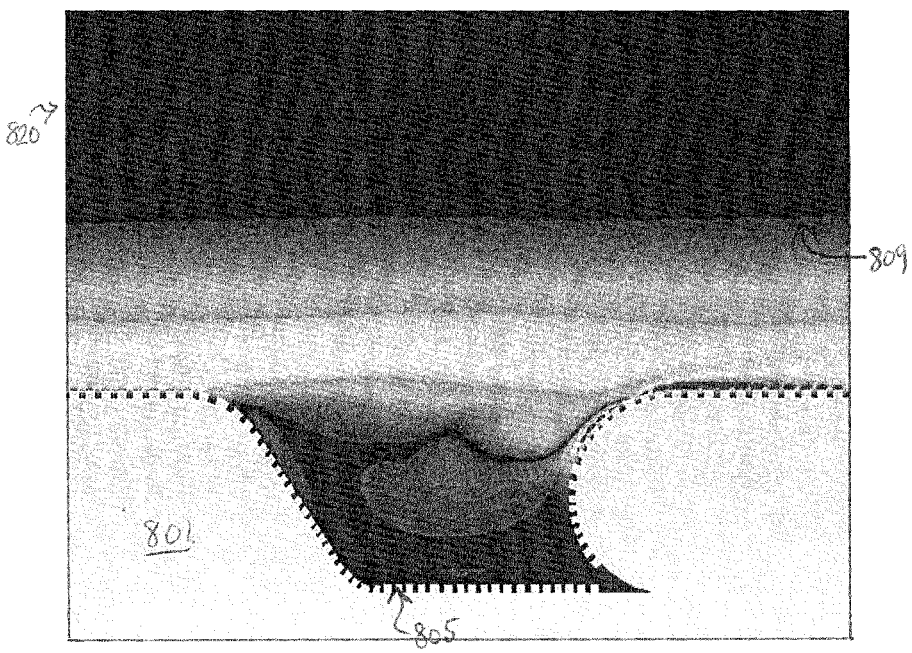
FIG. 13 illustrates an enlarged view of FIG. 12.

FIGS. 12 and 13 illustrate vorticity contours using a 2-D LES CFD simulation of fluid flowing from left to right as shown in the diagram along the bore 820 of a flexible pipe. Again only one wall of the carcass layer 801 and a part of the bore 820 is shown in the figure. In this case the flexible pipe body tested includes the carcass layer 801 with a cross sectional profile as shown in FIG. 9. FIG. 13 illustrates an enlarged view of the area around a cavity 805.

From FIGS. 12 and 13 it can be seen that the turbulence and vorticity of fluid adjacent the wall of the pipe body (carcass layer) is very much reduced compared to the known structure shown in FIGS. 5 and 6. The fluid flow is more laminar compared to FIGS. 5 and 6. The fluid flowing along the pipe body is affected by the protrusions. The protrusions effectively act to dissipate the cavity vortex structures. The surface pattern of protrusions help create micro-level turbulence, which extracts energy from the larger vortex structures that would be present otherwise (which cause the VIVs). That is, numerous relatively small eddies are created in a turbulent flow, thereby dissipating the larger flow structures caused by cavities in the carcass layer. As such, the periodic velocity and pressure oscillations in the cavity are reduced compared to known configurations. As such the resulting flow pattern is improved.

Aptly, the plurality of protrusions need to be of suitable dimensions to generate eddies at the dissipation range in the turbulence section, breaking up the turbulent structures, without causing large turbulence themselves.

Figure 14A:
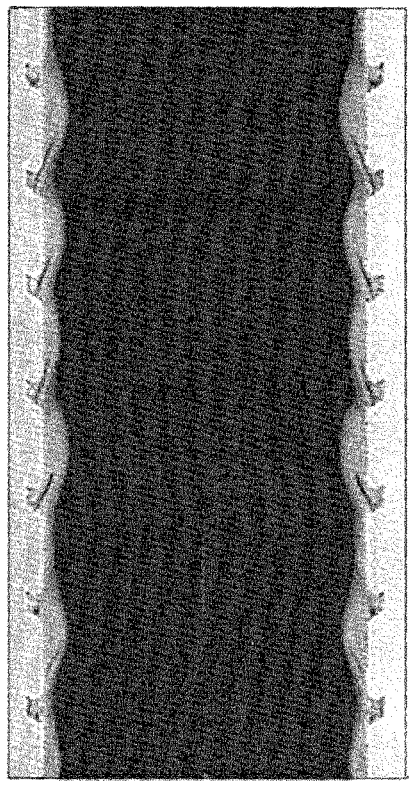
FIGS. 14a and 14b illustrate fluid flow through a known flexible pipe body and through a pipe body of the present invention, respectively.
Figure 14B:
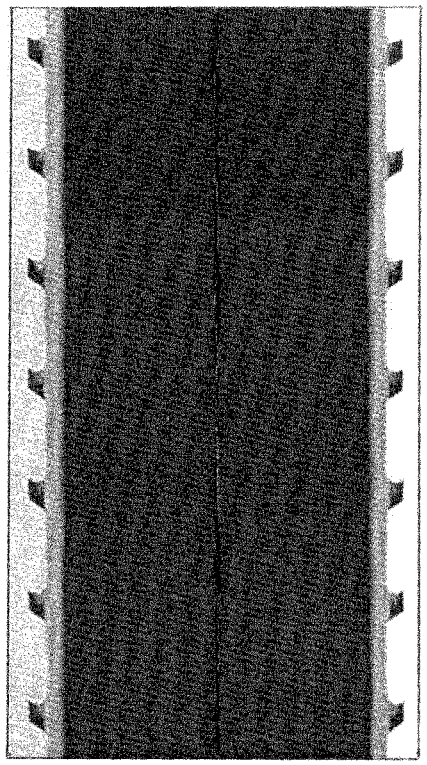

FIGS. 14a and 14b show a comparison of the 2-D LES CFD simulation results between a known carcass layer (FIG. 14a) and the carcass layer of the present invention (FIG. 14b). It can be seen that the arrangement of the present invention provides much reduced shear layer oscillations and vorticity compared to the known configuration.

In another embodiment, instead of forming the protrusions prior to the sheet being formed into a cylindrical configuration to form the cylindrical carcass layer, the protrusions may be formed at the same time as folding the sheet. More specifically, when using the above-mentioned cold forming process, one or more of the rollers used to fold the sheet may have a non-smooth surface pattern designed to indent the sheet at various predetermined positions as the sheet comes into contact with the roller for folding.

In yet another embodiment, the protrusions may be formed at the same time as the elongate tape element (sheet) is wound upon the mandrel. More specifically, the mandrel may have a plurality of substantially regular protrusions thereon, such that as the tape element is wound onto the mandrel, the protrusions indent the portion of tape element (sheet) that contacts the mandrel. This may require that the tape element is wound with a sufficient force to indent the tape element with the protrusions. Alternatively or additionally, the tape element may, at that time, be malleable, because of being heated, for example, such that lesser force is required to indent the tape element. As such, the protrusions on the mandrel will provide corresponding depressions on the carcass layer.

It will be appreciated that this particular method will only be able to provide protrusions/depressions to a limited degree within a cavity of a carcass layer. However, the protrusions/depressions provided on the innermost surface of a carcass layer will nevertheless still function to reduce shear layer oscillations and vorticity.

In yet another embodiment, the protrusions may be formed at a time after the substantially cylindrical carcass layer has been formed and optionally after the entire flexible pipe has been formed, or after pipe installation. That is, after the formation of a substantially cylindrical tubular element (which at this stage may be identical to known carcass layer configurations), the carcass layer may be "pigged" (a PIG is a Pipeline Inspection Gauge) using a tool that is drawn through the pipeline. The pig may be shaped to may have a non-smooth surface pattern on its edge(s) that comes into contact with the radially inner layer of a pipeline. The pig may be designed to indent the carcass layer at various predetermined positions as the pig comes into contact with carcass layer. The PIG may have a brush arrangement, to enable the PIG to form indents with an aggressive brushing action. Alternatively the PIG may have a cutting tool or tools as an attachment to enable shapes to be cut from or impinged into the radially inner surface of the pipe. The PIG may traverse at least a part of the length of the pipe and indent or roughen the radially inner surface of the carcass layer.

Alternatively, after the formation of a substantially cylindrical tubular element, the inner surface of the carcass layer may be blasted or punched with a suitable material, for example pellets or rods that are air driven towards the carcass surface, causing indentations into the surface of the carcass layer. Of course the material should be blasted or punched towards the carcass surface with sufficient force so as to form a depression of suitable dimensions.

Various modifications to the detailed designs as described above are possible. For example, although the protrusions 815 have been described above as generally square in cross section, the protrusions may take any shape, e.g. a convex protrusion (i.e. any outwardly projecting shape), a concave depression (i.e. any inwardly projecting shape), a polygon, a square, a rectangle, a triangle, or any combination thereof. The protrusions/depressions may be provided along a central longitudinal axis and/or a cross section taken in a direction orthogonal to the central longitudinal axis.

The protrusion may be any suitable ridge or convexity formed so as to help break up the boundary layer and reduce vorticity in fluid flowing through the pipe body.

Although the protrusions 815 have been described above as a protrusion that helically extends continuously around the inner surface of the carcass layer, other configurations are possible. For example, the plurality of protrusions may include stripes or zigzags extending in one or more directions, or have discrete shapes, e.g. a polygon, a square, a diamond, a rectangle, a triangle, a circle, an oval, or any combination thereof, when viewed radially from a centre of the pipe body.

Although the carcass layer described above is of stainless steel, the carcass layer could be formed from any suitable material, e.g. carbon steel, other metal, composite, polymer, or other material, or a combination of materials.

Although the carcass layer described above has been described to include helical windings of an elongate tape element, the carcass layer may be formed in other manners. For example, the carcass layer may be formed from a plurality of discrete annular elements that have connecting portions so as to interlock with adjacent annular elements. The adjacent annular elements may have one or more cavity extending from the inner surface of the carcass layer, such as at the point between adjacent annular elements, or in other areas of the inner surface of the carcass layer.

Although the above embodiments have protrusions formed integrally with the collapse resistant layer, the protrusions may be fixedly attached to a regular collapse resistant layer, during manufacture of the tape element (prior to winding). For example, the protrusions may be added by welding or adhering or bolting, or other method.

Although the carcass layer described above has been described to include protrusions/depressions that are regularly spaced, having protrusions/depressions that are spaced with about a 20% margin of error, or 15%, or 10%, or semi-randomly or randomly should enable the flexible pipe body to achieve the desired effects.

With the above-described arrangement it has been found that the provision of the plurality of protrusions on the innermost layer of pipe body is effective to reduce shear layer oscillations and vorticity of fluid flowing through the pipe body compared to known designs. As such, the overall velocity and pressure oscillations at the cavity face are greatly reduced in amplitude and severity leading to improved flow with no risk of high frequency vibrations causing a risk of fatigue failure of pipe components or equipment in the locality compared to the known design. This leads to smaller amplitude of shear layer flow oscillations and weaker acoustic sources, reducing or eliminating acoustic pulsation at the flow velocities typical in gas production.

The provision of the aerodynamic features is intended to intentionally disrupt the fluid flow along the flexible pipe. This actually reduces shear layer oscillations and vorticity of the fluid.

It may be understood also that the application of the present invention may be localised within a length of the pipe body, i.e. it is not necessary to apply the protrusions/depressions to the entire length of the pipe. The sections of the pipe body proximate to the end connectors could contain the protrusions/depressions to a linear length of pipe sufficient to disrupt the flow of gas as it exits the pipe so that the natural harmonic resonant frequencies of adjacent pipework and structures are not produced, while the remaining pipe length may remain manufactured from material of the prior art. Alternatively section lengths of pipe body containing protrusions/depressions may be distributed at discrete locations along the pipe length in order to achieve the desired suppressions of the acoustic vibrations.

The invention described above should therefore help in the prevention of unwanted riser singing, which will in turn improve fatigue life and increase the lifetime of a flexible pipe.

Reduction in shear layer oscillations may also lead to a lesser pressure drop in fluid flow through a flexible pipe. Increased production rates through the pipe may therefore be possible.

In addition, manufacture of the carcass layer or collapse resistant layer of the present invention may be easily implemented into existing pipe body manufacturing processes.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting fluids from a sub-sea location, comprising:
   a collapse resistant layer comprising a radially inner surface and a radially outer surface, the radially inner surface comprising a plurality of substantially regular protrusions and/or depressions extending in at least one direction perpendicular to a tangent of the radially inner surface, arranged to break up a boundary layer of fluid flowing along the flexible pipe body in use,
   wherein the collapse resistant layer comprises a helically wound elongate tape element having at least one cavity between adjacent windings of the tape element or wherein the collapse resistant layer comprises interlocked discrete annular elements, and wherein the collapse resistant layer comprises a plurality of cavities, each cavity between an annular element and an adjacent annular element;
   wherein the height of the protrusions or the depth of the depressions is between $1/70^{th}$ and $1/10^{th}$ the depth of each cavity.

2. Flexible pipe body as claimed in claim 1, wherein the plurality of protrusions and/or depressions extend at least partly along a longitudinal axis of the flexible pipe body.

3. Flexible pipe body as claimed in claim 2, wherein the plurality of protrusions and/or depressions extend at least partly around a circumference of the flexible pipe body.

4. Flexible pipe body as claimed in claim 1, wherein the plurality of protrusions and/or depressions have a shape comprising a polygon, a stripe, a zigzag, a square, a diamond, a rectangle, a triangle, a circle, an oval, or any combination thereof when viewed radially from a centre of the pipe body.

5. Flexible pipe body as claimed in claim 1, wherein, in a cross section taken along a central longitudinal axis or a cross section taken in a direction orthogonal to the central longitudinal axis, the collapse resistant layer has a profile with the plurality of protrusions and/or depressions having a shape comprising a convex protrusion, a concave depression, a polygon, a square, a rectangle, a triangle, or any combination thereof.

6. Flexible pipe body as claimed in claim 1, wherein the plurality of protrusions and/or depressions extend along a portion of the collapse resistant layer and the portion is at an end of the pipe body.

7. A method of providing a flexible pipe body, comprising:
   providing a collapse resistant layer comprising a radially inner surface and a radially outer surface, the radially inner surface comprising a plurality of substantially regular protrusions and/or depressions extending in at least one direction perpendicular to a tangent of the radially inner surface, arranged to break up a boundary layer of fluid flowing along the flexible pipe body in use,
   wherein the collapse resistant layer comprises a helically wound elongate tape element having at least one cavity between adjacent windings of the tape element or wherein the collapse resistant layer comprises interlocked discrete annular elements, and wherein the collapse resistant layer comprises a plurality of cavities, each cavity between an annular element and an adjacent annular element;
   wherein the height of the protrusions or the depth of the depressions is between $1/70^{th}$ and $1/10^{th}$ the depth of each cavity.

8. A method as claimed in claim 7, further comprising providing an elongate sheet element having the plurality of protrusions and/or depressions extending from a surface of the sheet element, and
   forming the sheet element into a substantially cylindrical configuration to form the collapse resistant layer.

9. A method as claimed in claim 7, further comprising
   providing an elongate sheet element;
   forming the plurality of protrusions and/or depressions on a surface of the sheet element; and
   forming the sheet element into a substantially cylindrical configuration to form the collapse resistant layer.

10. A method as claimed in claim 9, wherein forming the plurality of protrusions and/or depressions is performed at the same time as forming the sheet element into a substantially cylindrical configuration.

11. A method as claimed in claim 7, further comprising the steps of:
    providing an elongate sheet element; and
    forming the sheet element onto a mandrel having a plurality of substantially regular protrusions and/or depressions to thereby form the collapse resistant layer having the protrusions and/or depressions.

12. A method as claimed in claim 7, further comprising the steps of:
    providing a substantially cylindrical tubular element; and then
    forming the plurality of protrusions and/or depressions on a radially inner surface of the tubular element to thereby form the collapse resistant layer.

13. A method as claimed in claim 12, wherein the step of forming the plurality of protrusions and/or depressions comprises forming depressions in the collapse resistant layer by pigging the flexible pipe body with a suitably configured pig, or blasting the radially inner surface of the collapse resistant layer with a material at a force sufficient to form depressions.

* * * * *